(12) United States Patent
Thielman

(10) Patent No.: US 6,200,399 B1
(45) Date of Patent: Mar. 13, 2001

(54) METHOD AND APPARATUS FOR EMBOSSING A PRECISION PATTERN OF MICRO-PRISMATIC ELEMENTS IN A RESINOUS SHEET OR LAMINATE

(75) Inventor: Scott Thielman, Arlington Heights, IL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/231,197

(22) Filed: Jan. 14, 1999

(51) Int. Cl.[7] .................................................... B32B 31/16
(52) U.S. Cl. ........................ 156/73.1; 156/209; 156/498; 156/499; 156/553; 156/555; 156/580.2
(58) Field of Search .................................. 156/73.1, 209, 156/219, 498, 499, 553, 555, 580.1, 580.2; 264/442, 443, 444

(56) References Cited

U.S. PATENT DOCUMENTS

| 1,906,655 | * | 5/1933 | Stimson | 65/362 |
| 3,684,348 | * | 8/1972 | Rowland | 350/103 |
| 4,478,769 | * | 10/1984 | Pricone et al. | 264/1.6 |
| 4,486,363 | * | 12/1984 | Pricone et al. | 264/1.4 |
| 4,601,861 | * | 7/1986 | Pricone et al. | 264/1.6 |
| 5,336,452 | * | 8/1994 | Cohen et al. | 264/444 |
| 6,015,214 | * | 1/2000 | Heenan et al. | 359/529 |

* cited by examiner

*Primary Examiner*—James Sells
(74) *Attorney, Agent, or Firm*—Jones, Day, Reavis & Pogue

(57) ABSTRACT

An improved method and apparatus is provided for continuously embossing a precision pattern of micro-prismatic elements on a surface of a resinous sheeting material with the aid of an endless metal embossing belt. The method includes the steps of moving the belt along a closed path through a heating station and a cooling station, conveying superimposed resinous film and sheeting material into proximity with the belt, passing the film and sheeting between the belt and a series of sonic welding heads to thereby begin to impress a pattern of micro-prismatic formations of the belt into one surface of the sheeting, pressing the film and sheeting against the heated belt until the one surface of the sheeting fully conforms to the embossing pattern, and stripping the film and embossed sheeting from the belt.

22 Claims, 4 Drawing Sheets

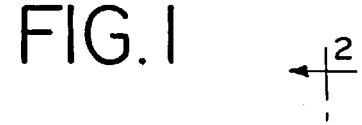
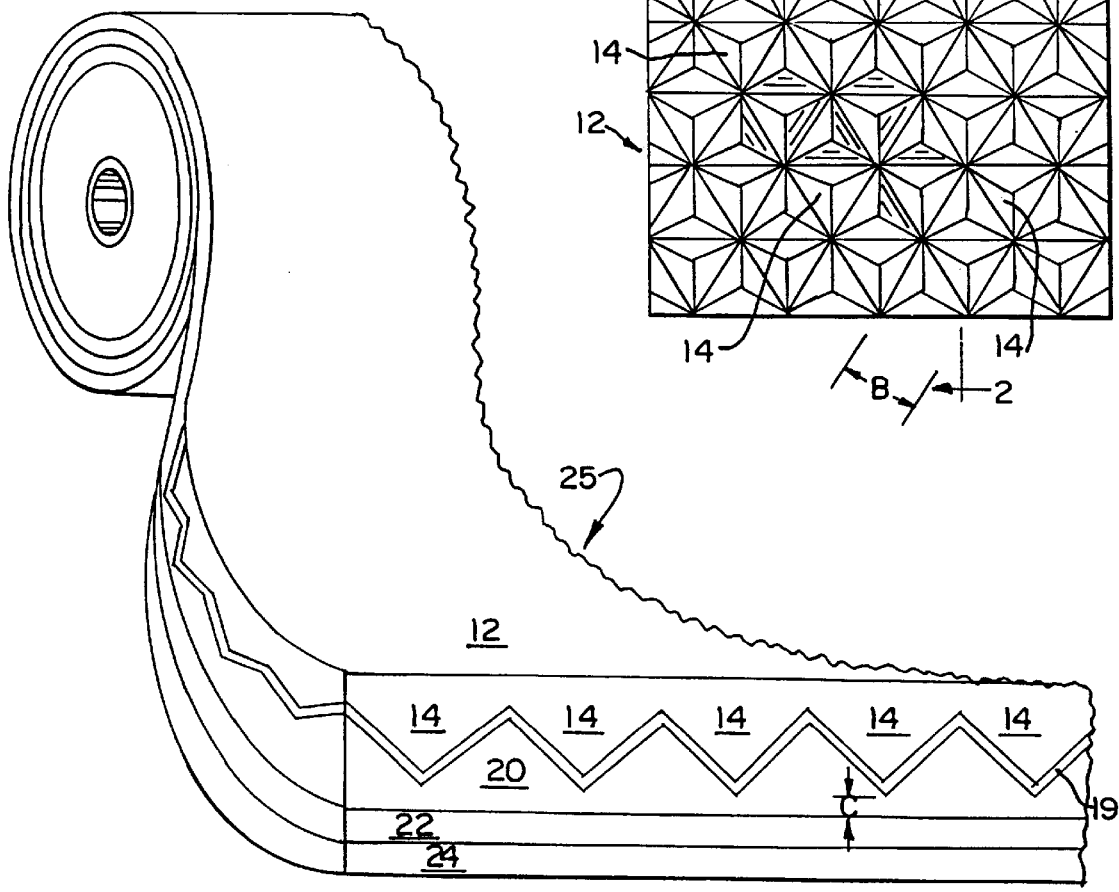
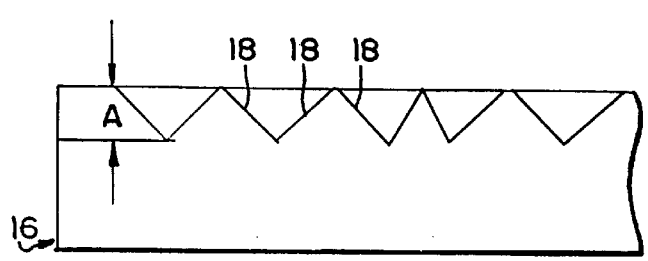

METHOD AND APPARATUS FOR EMBOSSING A PRECISION PATTERN OF MICRO-PRISMATIC ELEMENTS IN A RESINOUS SHEET OR LAMINATE

BACKGROUND OF THE INVENTION

1. Field of the Invention

The present invention relates generally to an improved method and apparatus for producing sheeting having precision patterns of micro-prismatic elements formed therein and, more particularly, to an improved method and apparatus for continuously embossing the surface of a film or film laminate with a pattern of precisely formed cube-corner retroreflective elements.

2. Description of the Related Art

Cube-corner type reflectors have long been in use in such applications as pavement markers, automobile reflectors and retroreflectors for use in highway signage construction, for example. The phrases "cube-corner," or "trihedral" or "tetrahedron" are well recognized terms in the art for structure consisting of three mutually perpendicular faces, without regard to the size or shape of each face, or the optical axis of the element so provided. One early example of a cube-corner type reflector is disclosed in the patent to Stimson, U.S. Pat. No. 1,906,655, issued May 2, 1933.

In more recent times, cube-corner retroreflective elements have been used advantageously not only in pavement markers and automobile reflectors, but also in flexible retroreflective sheeting suitable for use in highway signage construction, for example. Retroreflective sheeting requires, among other things, a drastic reduction in the size of the cube-corner elements by comparison to the elements used typically in pavement markers and automobile reflectors. Cube-corner type reflectors, to retain their functionality of reflecting light back generally to its source, require that the three reflective faces be maintained flat and within several minutes of 90° relative to each other. Spreads beyond this, or unevenness in the faces, results in significant light spread and a drop in intensity at the location desired. A more detailed description of the optics of cube and microcube structures are found in commonly assigned co-pending application U.S. Ser. No. 08/655,545 (as published in PCT case US97/08806), the disclosure of which is incorporated herein by reference.

For many years, it was suggested that cube-corner retroreflective sheeting could not be manufactured successfully using embossing techniques (e.g., Rowland, U.S. Pat. No. 3,684,348, column 5, lines 30–42). However, embossing techniques were perfected such that embossed microcube retroreflective sheeting is now readily available. An example of a successful method for embossing sheeting is disclosed in U.S. Pat. No. 4,601,861, issued to Pricone et al. and assigned to the common assignee herein, the disclosure of which is incorporated specifically herein by reference.

While the method and apparatus disclosed in the aforementioned Pricone et al. patent performs effectively in continuously producing high quality microcube retroreflective sheeting, a disadvantage of such a system is the time involved in forming the prismatic elements. Generally, such a system is only capable of producing the embossed film at a rate of no more than thirty lineal inches per minute. The principal time factor in this system is that required to heat the film to its glass temperature, to enable formation of the microprismatic elements. This requires multiple embossing machines if high volume production is desired. Consequent cost in terms of machine maintenance and floor space, for example, also is therefore required. Accordingly, it is desirable to provide a method and apparatus capable of increasing production capacity of microcube retroreflective sheeting over prior known technology. Further, it is desirable to provide such a method and apparatus which produces a high quality finished product. It is further desirable to provide such a method and apparatus which is practical and relatively inexpensive to use. Still further, it is desirable to provide for the high production of embossed sheeting or laminates formed with precise patterns of micro-prismatic cells which can serve functions other than in retroreflective sheeting.

SUMMARY OF THE INVENTION

The present invention improves over the prior art by providing an improved method for continuously embossing a precision pattern of micro-prismatic elements on a surface of a resinous sheeting material with the aid of an endless metal embossing belt. The method includes the steps of moving the belt along a closed path through a heating station and a cooling station, conveying superimposed resinous film and sheeting material into proximity with the belt, passing the film and sheeting between the belt and a series of sonic welding heads to thereby begin to impress a pattern of micro-prismatic formations of the belt into one surface of the sheeting, pressing the film and sheeting against the heated belt until the one surface of the sheeting fully conforms to the embossing pattern, and stripping the film and embossed sheeting from the belt.

BRIEF DESCRIPTION OF THE DRAWINGS

The foregoing and other novel features and advantages of the invention will be better understood upon a reading of the following detailed description taken in conjunction with the accompanying drawings in which:

FIG. 1 is a fragmentary plan view, greatly enlarged, of the embossed surface of one form of microcube retroreflective sheeting produced by the present invention;

FIG. 2 is a fragmentary side schematic view, greatly enlarged, showing the embossing pattern of one form of an embossing tool for embossing the retroreflective pattern of the sheeting of FIG. 1, as though taken along the line 2—2 of FIG. 1, except that the tool is of female microcubes and the finished film is of male microcubes;

FIG. 3 is a schematic perspective view of one form of retroreflective sheeting produced by the present invention, after further processing has rendered the sheeting ready for installation;

DETAILED DESCRIPTION OF THE PREFERRED EMBODIMENTS

Figure 4:
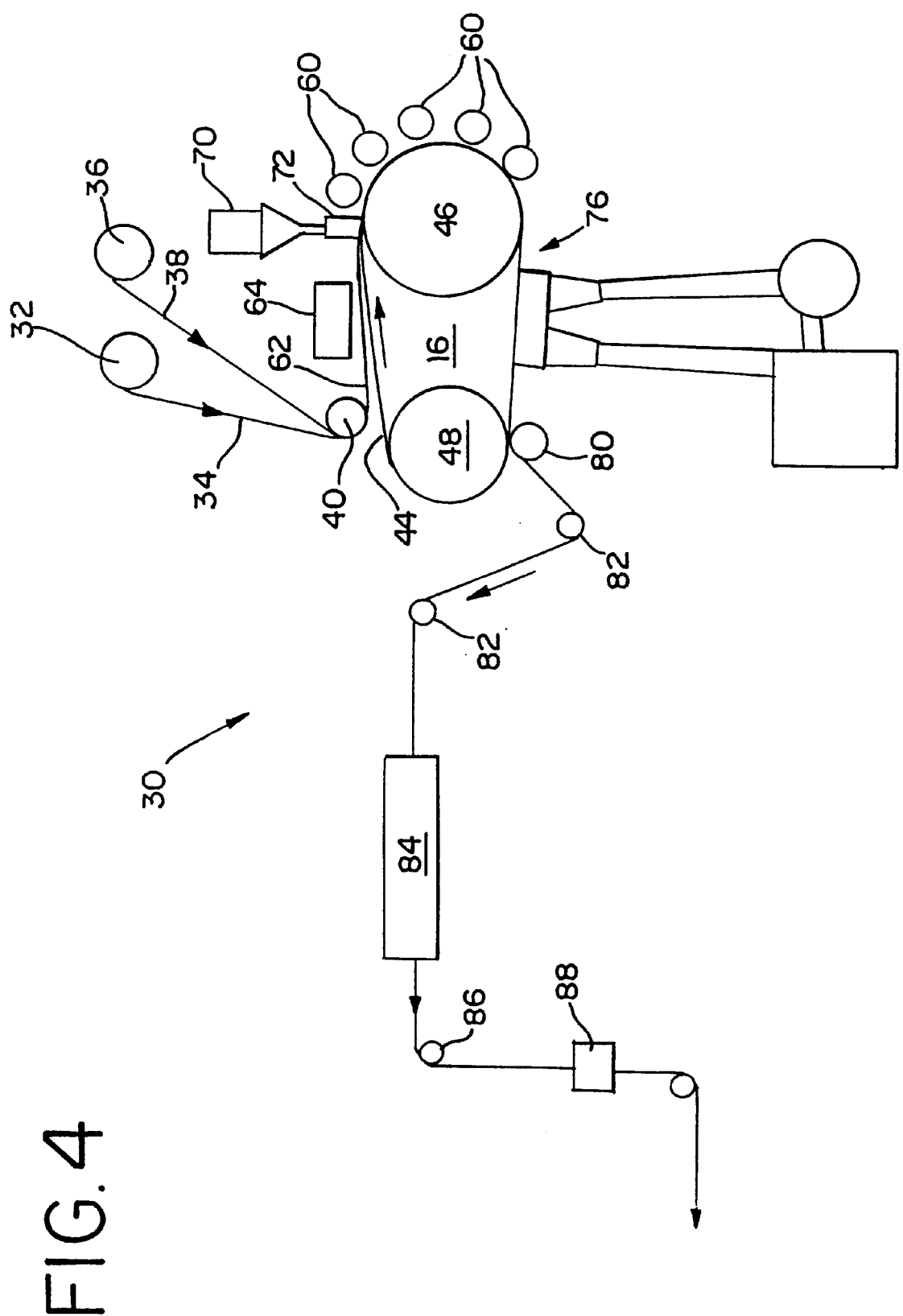
FIG. 4 is a schematic view of one form of apparatus constructed in accordance with the principles of the invention for producing the retroreflective sheeting of FIGS. 1 and 3.

The present invention will first be described in connection with the production of high quality retroreflective sheeting, although other sheeting applications will be discussed hereinafter.

Referring now to the drawings, and initially to FIG. 1, a portion of retroreflective sheeting is designated generally by the reference numeral 12. The sheeting 12 is preferably of thermoplastic material having embossed on one surface thereof a repeating pattern of retroreflective microcube-corner type reflector elements 14. The thermoplastic material may advantageously be acrylic. Sheeting 12 initially had smooth front and back surfaces and was on the order of 0.006 inch (0.15 mm) thick. Alternatively, the sheeting 12 may consist of a laminate of different thermoplastic materials having different characteristics, as hereinafter described.

The retroreflective pattern of elements 14 was formed with the aid of embossing tool 16 of a thin flexible belt or cylinder of the type produced in accordance with that invention entitled Embossing Tool and Method of Producing Same, U.S. Pat. No. 4,478,769, and assigned to applicant's assignee. Other shapes and arrays of microcube elements may be formed on the tool. Such shapes may be hexagons, triangles, rectangles or the like as disclosed in aforesaid U.S. Ser. No. 08/655,545.

As shown in FIG. 2, the embossing tool 16 has on one surface an embossing pattern 18, the depth of which is indicated by dimension A. One example for dimension A may be 0.00338 inch (0.085 mm). Dimension B of FIG. 1 represents the distance between parallel grooves which, for the "A" dimension provided, would be on the order of 0.0072 inch (0.18 mm).

FIG. 3 shows one form of sheeting 12 produced by the present invention, after further processing and ready for use. More specifically, the retroreflective pattern of cube corner elements 14 may be covered with a metalized layer 19, which in turn may be covered by a suitable backing material 20, in turn covered by a suitable adhesive 22 for mounting, in turn covered by release paper 24. The thickness of the metalizing layer 19 is essentially immeasurable. Backing material 20 may have a thickness, dimension C, of about 0.001 inch (0.025 mm) and the thickness of the adhesive layer 22 may be about 0.0015 inch (0.038 mm). The total thickness of the complete structure 25 is about 0.010 inch (0.25 mm) and the structure 25 is flexible enough so it can be rolled and readily stored on a supply reel 26. Another version may consist of air cells formed by sonic welding of a rear film layer to the embossed layer, as disclosed in applicants' co-pending application Ser. No. 08/566,006, commonly assigned.

In accordance with the invention, one form of machine 30 for producing the cube corner sheeting 12 is shown schematically in elevation in FIG. 4. A supply reel 32 of unprocessed acrylic web 34 is mounted above the machine as is a supply reel 36 of transparent plastic film 38, such as Mylar. In the illustrated embodiment, the web 34 may be 0.006 inch (0.15 mm) thick and the film 38 may be 0.002 inch (0.05 mm) thick. The flat web 34 and the film 38 are fed from the reels 32 and 36, respectively, to a guide roller 40 positioned in close proximity to the embossing means 16.

The embossing means 16 includes an embossing tool in the form of an endless metal belt 44 which may be about 0.020 (0.5 mm) inch in thickness and 54 inches in circumference and 22 inches wide. The width and circumference of the belt 44 will depend in part on the width of the material to be embossed, as well as on the desired embossing speed and the thickness of the belt 44. The belt 44 is mounted on and supported for rotation by a heating roller 46 and a post-cooling roller 48 having parallel axes. Rollers 46 and 48 may be driven by chains (not shown) to advance the belt 44 in the direction of the arrow. Belt 44 is provided on its outer surface with a continuous female embossing microprismatic pattern such as the cubes 18 (FIG. 2).

Evenly spaced around the belt for about 180° around the heating roller 46 are a plurality, at least three, and as shown five, pressure rollers 60 of a resilient material, preferably silicone rubber, with a durometer hardness ranging from Shore A 20 to 90, and preferably from Shore A 60 to 90. While the rollers 46 and 48 could be the same size, the diameter of heating roller 46 is about 10½ inches (26.6 cm) and the diameter of the post-cooling roller is about 8 inches (20.3 cm). The diameter of each pressure roller 60 is about 6 inches (15.2 cm). The heating roller 46 or the post-cooling roller 48 may have axial inlet and outlet passages joined by an internal spiral tube for circulation therethrough of hot oil (in the case of the heating roller) or other liquid (as in the case of the cooling roller) supplied through appropriate lines.

The web 34 and film 38 are fed over guide roller 40 where they are superimposed to form a laminate 62 which then is conveyed over the belt 44. In preferred form, the machine 30 is provided with a series of infrared heaters 64 which serve to preheat the laminate 62 after it has passed around the guide roller 40. In accordance with the invention the laminate 62 then passes between heating roller 46 and a series of sonic welders 70. The sonic welders 70 may be of a type operated by a 120 volt 60 Hertz power supply designed to vibrate at 20,000 cycles per second with horns 72 that move through 0.010 inch. Although only one sonic welder 70 is shown, in practice, the machine 30 will comprise several welders 70 positioned in staggered relation to cover the full width of the laminate 62. The welders 70 serve to essentially drive the heated web 34 into the embossing tool 44 to initiate formation of the microcube corner retroreflective elements 14.

The laminate 62 then passes under pressure rollers 60 and is moved with the belt 44 around the heating roller 46 and then along the belt 44 through a generally planar cooling station 76. The film 38, which has a higher glass transition temperature than the web 34, performs several functions during this operation. First, it serves to maintain the web 34 under pressure against the belt 44 while traveling around the heating roller 46, thus assuring conformity of the web 34 with the precision pattern 16 of the tool during the change in temperature gradient as the web 34 drops below the glass transition temperature of the material. Second, the film 38 maintains what will be the outer surface of the sheeting in a flat and highly finished surface for optical transmission. Finally, the film 38 acts as a carrier for the web 34 in its weak "molten" state and prevents the web 34 from otherwise adhering to the pressure rollers as the web 34 is heated above the glass transition temperature. The cooling station 76 is preferably of a type disclosed in the aforementioned U.S. Pat. No. 4,601,861 which operates with chilled fluid.

The machine 30 includes a stripper roller 80 around which the laminate 62 passes to remove the laminate 62 from the belt 44 shortly before the belt 44 itself contacts the post-cooling roller 48. The laminate 62 then is fed from stripping roller 80 over further guide rollers 82 to an annealing means 84. The laminate 62 then emerges from the annealing means 84 guided by additional guide rollers 86 with the film 38 facing outwardly, past a monitoring device 88 which continuously monitors the optical performance of the sheeting. From there, the finished laminate 62 having the embossed sheeting 13 may be transferred to a wind-up roller (not shown) for removal and further processing.

Figure 5:
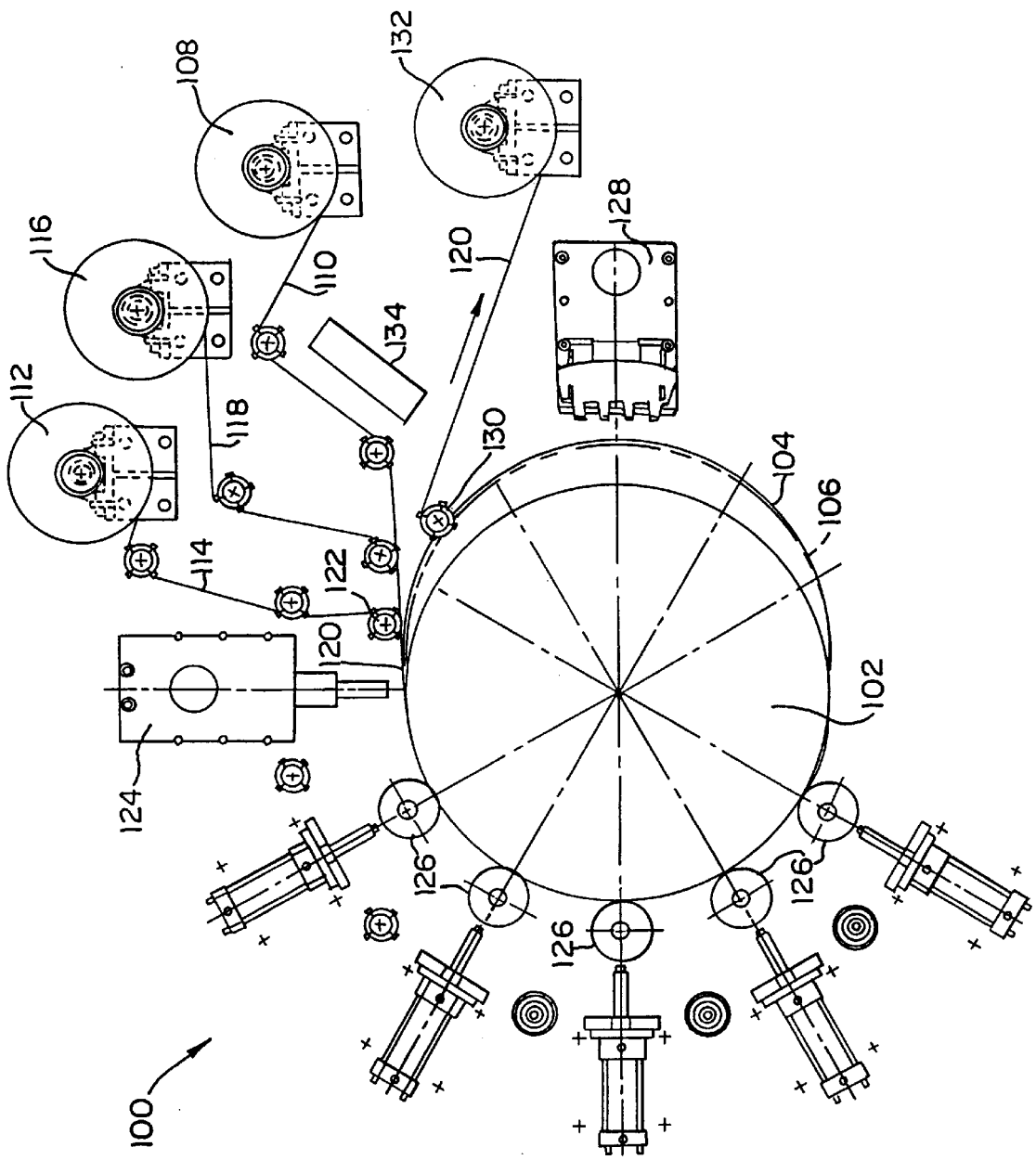
FIG. 5 is a schematic view of a second form of apparatus constructed in accordance with the principles of the invention for producing the retroreflective sheeting of FIGS. 1 and 3.

A second form of embossing machine constructed in accordance with the principles of the invention is illustrated in FIG. 5 and designated generally by the reference numeral 100. The machine 100 includes as a principal component a heated roller 102 which is much larger than the roller 46 and is preferably on the order of 34 inches (86.4 cm) in diameter. As in the machine 30, an endless metal belt 104 provided with an embossing pattern passes around the roller 102 and is heated thereby. The machine 100 also includes a cooling shoe 106 over which the belt 104 passes, as will be described in detail hereinafter.

A supply reel 108 of unprocessed acrylic web 110 is mounted over the machine as is a supply reel 112 of transparent Mylar 114. In this embodiment of the invention, an intermediate supply reel 116 of UV stabilized face film 118 is also provided. The resulting composite 120 passes around a guide roller 122 and beneath a series of essentially aligned sonic welders 124, only one of which can be seen, which essentially begins to drive the web 110 into the embossing belt 104. The laminate 120 then passes around the heater roller 102 beneath a series of pressure rollers 126 where the web 110 is fully impressed into the belt 104.

The cooling shoe 106 is an arcuate, hollow member through which chilled fluid flows. The shoe 106 serves to lower the temperature of the laminate to preferably on the order of 100° F. aided by a cold air plenum 128 which blows on the laminate 120. The laminate 120 then passes around a stripper roller 130 and is drawn to a wind-up roller 132. As in the machine 30, a series of infrared heaters 134 may be provided to preheat the web 110.

Figure 6:
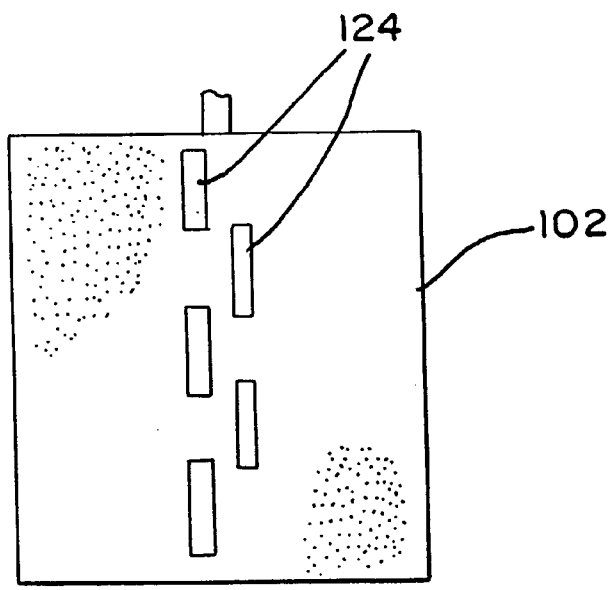
FIG. 6 is a top schematic view of an embossing roller in accordance with the invention showing one form of orientation of multiple ultrasonic vibration heads.

FIG. 6 shows a top schematic view of a heated roller 102 illustrating one form of orientation of multiple ultrasonic welders 124 spaced along the width of the roller 102. Preferably, the welders 124 are positioned in staggered overlapping relation so that the welders 124 act on the laminate 120 continuously across its entire width.

Figure 7:
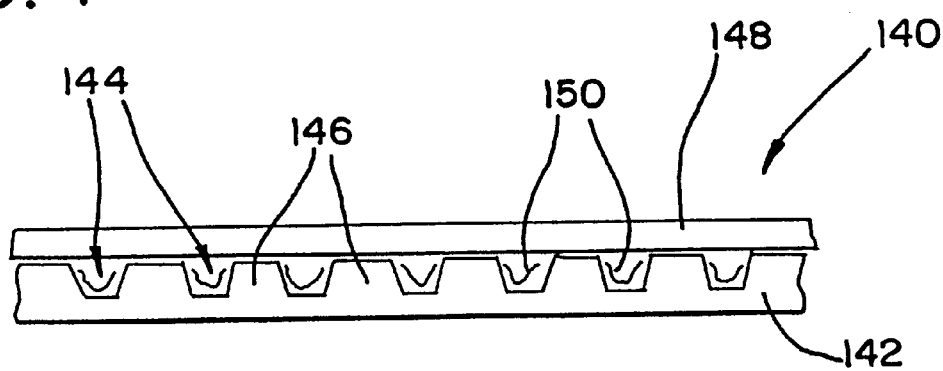
FIG. 7 is a side schematic view of a micro-prismatic laminated product other than retroreflective sheeting.

Referring now to FIG. 7, another form of laminate, shown greatly enlarged, is designated by the reference numeral 140. This form of laminate 140 has a layer of thermoplastic material 142 embossed with a pattern of microprismatic type channels 144 defining upstanding support portions 146. A cover layer 148 is later thermally welded to the support portions 146. The channels 144 may in this form of laminate contain a deposit of a suitable chemical composition 150 which changes color in the presence of a bodily fluid, which is drawn into the channels 144 by capillary action. An application for such a device may, for example, be a home pregnancy test kit. The layer 142 is readily embossed using the ultrasonic technique as hereinabove described.

Figure 8:
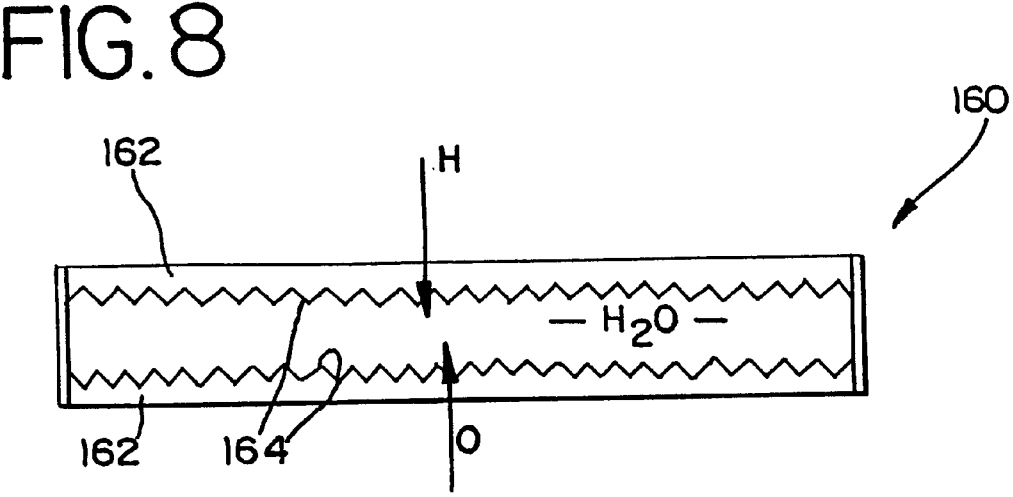
FIG. 8 is a side schematic view of another micro-prismatic laminated product other than retroreflective sheeting.

FIG. 8 illustrates yet another laminate 160 comprising two sheets of spaced thermoplastic material 162 embossed with a pattern of microprismatic type projections 164. This structure 160 is suitable for use as a fuel cell in accordance with well-known electro-chemical technology and the sheets 162 are also readily embossed using the ultrasonic technique hereinabove described.

It can now be appreciated that embossing machines 30 and 100 constructed in accordance with the invention provide considerable improvement over prior art devices in terms of production output capacity. A typical embossing machine of the type disclosed, for example, in aforementioned U.S. Pat. No. 4,601,861 has a sheeting production rate of three feet (0.91 m) per minute. In contrast, with the present machines, production rates as high as 30 feet (9.1 m) per minute are believed readily attainable. This production rate increase is directly attributable to the preheating of the film together with the initial forming of the cube corner retroreflective elements by the sonic welding heads prior to conveying the laminate under the pressure rollers and around the heated roller.

In preferred form, the machines 30 and 100 may use five welding heads 124 having a nominal width each of 11.5 inches (29.2 cm) as are presently commercially available. An embossing belt 104 may thereby be used having a width on the order of 52 inches (1.32 m) to form finished film 120 having a width on the order of 48½ inches (1.123 m)

It can further be appreciated that the machines 30 and 100 are also capable of producing sheeting of high optical intensity at considerably greater speed than heretofore known. One advantage of the machine 100 is that the large diameter roller 102 and shoe 106 arrangement greatly increases the life of the generally cylindrical metal embossing belt 104 by reducing bending stresses on the belt 104 as are present in the machine 30. The large roller 102 also increases the working area of the belt 104 to help speed production.

While the present invention has been described in connection with preferred embodiments thereof, it will be apparent to those skilled in the art that many changes and modifications may be made without departing from the true spirit and scope of the present invention. Accordingly, it is intended by the appended claims to cover all such changes and modifications as come within the true spirit and scope of the invention.

What is claimed is:

1. A method for continuously embossing a precision pattern of micro-prismatic elements on one surface of a continuous resinous sheeting material, the method being performed with the aid of a generally cylindrical metal embossing element having an inner surface and an outer surface, the outer surface having a precision embossing pattern which is the reverse of the precision pattern to be formed on one surface of said sheeting, and wherein the method includes the steps of:

(a) continuously moving the embossing element through a heating station where said embossing element is heated to a predetermined temperature and then to a cooling station where said embossing element is cooled below said predetermined temperature;

(b) continuously conveying into proximity with said embossing element superimposed resinous film and at least one layer of sheeting material, said resinous materials of said film and said sheeting each having different glass transition temperatures;

(c) continuously passing said superimposed resinous film and sheeting between said embossing element and at least one sonic welding head with one surface of said sheeting confronting and engaging said precision pattern of said embossing element to thereby begin to impress said pattern into said sheeting;

(d) heating said embossing element to said predetermined temperature at said heating station, said temperature being greater than the glass transition temperature of said sheeting and less than the glass transition temperature of said resinous film;

(e) pressing said superimposed film and sheeting against said embossing element at a plurality of pressure points sequentially spaced along said heating station with said one surface of said sheeting confronting and engaging said precision pattern of said embossing element until said one surface of said sheeting fully conforms to said precision embossing pattern; and (f) continuously stripping said superimposed layer of film and embossed sheeting from said embossing element.

2. The method according to claim 1, including the step of preheating said resinous film prior to passing said film and sheeting between said embossing element and said at least one sonic welding head.

3. The method according to claim 1, including the step of cooling said superimposed film and sheeting prior to stripping said film and sheeting from said embossing element.

4. The method according to claim 1 wherein said path is substantially cylindrical through said heating station and said pressure points are provided by at least three spaced pressure rollers.

5. The method according to claim 1 wherein said precision pattern is in the form of an array of female microcube corner type elements whereby the sheeting formed thereby has male microcube corner elements on one face thereof.

6. The method according to claim 1 wherein said at least one sonic welding head vibrates at approximately 20,000 cycles per second.

7. The method according to claim 1 wherein said at least one sonic welding head vibrates approximately 0.010 inch.

8. The method according to claim 1, including providing multiple sonic welding heads arranged across a width of said metal embossing element.

9. The method according to claim 8, wherein said sonic welding heads are arranged in staggered overlapping relation.

10. Apparatus for continuously embossing a precision pattern of micro-prismatic elements on one surface of transparent resinous material, said apparatus comprising:

embossing means including an embossing tool in the form of a thin metal element having an inner surface and an outer surface, said outer surface having a precision embossing pattern thereon which is the reverse of the precision pattern to be formed in the resinous material;

means for continuously moving said embossing element along a closed path;

means for introducing superimposed film and sheeting of resinous materials onto said embossing element with one face of said sheeting in direct contact with said pattern on said embossing element;

means for applying sonic vibration to said superimposed film and sheeting with said one face of said sheeting in direct contact with said embossing element to thereby begin to heat an impress said pattern into said sheeting;

means for raising the temperature of said embossing element to the glass transition temperature of said sheeting and below the glass transition temperature of said film while said embossing element is in a first portion of its path;

pressure means sequentially spaced along said first portion of said path for pressing said superimposed film and sheeting against said embossing element until said one surface fully conforms to said embossing pattern; and means for stripping said superimposed film and embossed sheeting from said embossing element.

11. Apparatus according to claim 10, including means for preheating said resinous film prior to introducing said film and sheeting onto said embossing element.

12. Apparatus according to claim 10, including means for cooling said superimposed film and sheeting prior to stripping said film and sheeting from said embossing element.

13. Apparatus according to claim 10 wherein said closed path is substantially cylindrical.

14. Apparatus according to claim 10 wherein said embossing tool is endless and seamless.

15. Apparatus according to claim 10 wherein said precision pattern is in the form of an array of female microcube corner type elements whereby the sheeting formed thereby has male microcube corner elements on one face thereof.

16. Apparatus according to claim 10 wherein said means for applying sonic vibration to said superimposed film and sheeting includes at least one sonic welding head vibrating at approximately 20,000 cycles per second.

17. Apparatus according to claim 10 wherein said means for applying sonic vibration to said superimposed film and sheeting includes a sonic welding head vibrating at approximately 0.010 inch.

18. Apparatus according to claim 12 wherein said means for cooling includes a shoe member having chilled fluid running therethrough.

19. Apparatus according to claim 18 wherein said embossing element passes over said shoe member.

20. Apparatus according to claim 12 wherein said means for cooling includes a cold air plenum.

21. Apparatus according to claim 10 wherein said means for applying sonic vibration includes a plurality of sonic welding heads arranged across a width of said embossing element.

22. Apparatus according to claim 20 wherein said sonic welding heads are arranged in staggered overlapping relation along the width of the embossing element.

* * * * *